United States Patent [19]

Briggs

[11] Patent Number: 4,738,611
[45] Date of Patent: Apr. 19, 1988

[54] CROSS HEAD DIE

[75] Inventor: Milton Briggs, York, Pa.

[73] Assignee: Graham Engineering Corporation, York, Pa.

[21] Appl. No.: 21,662

[22] Filed: Mar. 4, 1987

[51] Int. Cl.⁴ .............................................. B29C 47/28
[52] U.S. Cl. ..................... 425/461; 264/173; 264/209.8; 425/131.1; 425/467; 425/532
[58] Field of Search ..................... 425/133.1, 113, 114, 425/131.1, 376 A, 461, 462, 532, 523, 528, 466, 467; 264/173, 209.1, 209.3, 209.8; 156/244.13, 500

[56] References Cited

U.S. PATENT DOCUMENTS

| | | | |
|---|---|---|---|
| 2,957,201 | 10/1960 | Fields et al. | 425/133.1 X |
| 3,026,565 | 3/1962 | Bonner | 425/467 |
| 3,245,662 | 4/1966 | Booy | 366/177 |
| 3,404,432 | 10/1968 | White et al. | 425/113 |
| 3,520,966 | 7/1970 | Soffiantini | 425/133.1 X |
| 4,061,461 | 12/1971 | Hessenthaler | 425/462 |
| 4,280,801 | 7/1981 | Wheeler, Jr. et al. | 425/113 |
| 4,402,898 | 9/1983 | Rosenbaum | 264/209.8 X |
| 4,421,465 | 12/1983 | Herrington | 264/173 X |
| 4,484,877 | 11/1984 | Stucke et al. | 425/462 X |
| 4,495,022 | 1/1985 | Viriyayvthakorn et al. | 156/500 |
| 4,522,775 | 6/1985 | Briggs et al. | 425/133.1 X |
| 4,533,308 | 8/1985 | Cloeren | 425/133.1 X |
| 4,578,024 | 3/1986 | Sicka et al. | 425/114 |

Primary Examiner—Richard L. Chiesa
Attorney, Agent, or Firm—Thomas Hooker

[57] ABSTRACT

A cross head die for extruding an annular layer of thermoplastic resin on a mandril includes a resin flow path having an inlet, a cardioid shaped primary distribution channel, a gate passage, an equilibration chamber and a transfer channel surrounding the mandril and a mouth at the downstream end of the transfer channel opening into a resin extrusion channel surrounding the mandril.

23 Claims, 5 Drawing Sheets

CROSS HEAD DIE

BACKGROUND OF THE INVENTION

The invention relates to resin extrusion heads and particularly to a parison extrusion head having a cross head die module surrounding a mandril and a resin flow path extending from an inlet on one side of the module to an outlet mouth surrounding the mandril.

BRIEF DESCRIPTION OF THE PRIOR ART

The parison extrusion head of U.S. Pat. No. 4,280,801 flows plastic resin from an inlet through internal passages and onto a mandril. The inlet communicates with an annular channel having two like arms with inner and outer edges defined by eccentric circles and with the width of the channel at the ends of each arm located at the 180 degree position opposite the inlet reduced to zero. Resin from the inlet fills the channel and flows radially inwardly through a gate passage to a conical distribution passage leading to a mouth surrounding the mandril. The inner and outer edges of the gate passage are defined by eccentric circles so that the passage has a decreasing radial width away from the inlet.

SUMMARY OF THE INVENTION

The disclosed extrusion head cross head die module includes an improved resin flow path for flowing softened and plasticized thermoplastic resin from an inlet, around the mandril and then onto the mandril to form a circumferentially continuous and seam free layer of undegraded plastic resin for subsequent extrusion as a parison.

The resin flows through the head free of stagnation and the risk of resultant degradation of the properties of the resin in an article manufactured from the parison. This feature is particularly important where the resin flowed through the module possesses easily degraded barrier or adhesive properties essential to the utility of an article. For instance, a number of cross head die modules with flow passages per the invention may be stacked together surrounding a common mandril for coextrusion of a multi-layer parison which is blow molded to form a container with layers having structural, adhesive and barrier properties. The easily degraded barrier and tie resins are moved through the module flow paths and to the mandril efficiently so that the barrier layer in the container is continuous and properly adhered to adjacent layers. Stagnation may also degrade the properties of the structural layers.

The resin flow path of the invention includes a cardioid-shaped primary distribution channel communicating with an inlet passage and extending from the inlet passage around the mandril. This channel is defined by cardioid-shaped inner and outer edges and is believed to conform to the flow path of pressurized resin in an annular channel with an inner circumferential gate passage. The flow cross sectional area of the channel decreases away from the inlet to compensate for loss of resin flowing out of the channel through the gate. All the resin flowed into the channel is moved through the channel and radially inwardly through the gate to the equilibration chamber. Resin does not stagnate in the channel. This feature facilitates purging of the flow path of resin when it is necessary to flow a new resin through the module.

The inner edge of the primary distribution channel communicates with a narrow height gate passage. This passage decreases in radial width from the inlet to the 180 degree position and has a cardioid-shaped inner edge sharing a common cusp point with the cusp point of the inner edge of the primary distribution channel. The gate passage opens into an inner equilibration chamber which in turn communicates with the annular upstream end of a conically shaped transfer channel having a downstream end at the 360 degree mouth surrounding the mandril and opening into the extrusion channel.

The decreased radial width of the gate passage away from the inlet compensates for the reduced pressure of the resin in the primary distribution channel away from inlet to assure that resin moves through the gate and into the equilibration chamber at a circumferentially uniform rate.

Pressure gradients remaining in the resin flowing into the equilibration chamber are equilibrated in the chamber to assure that all resin flowing into the transfer channel is at a constant pressure. The plastic flowing into the equilibration chamber from the ends of each arm of the primary distribution channel at the cusp is welded together to form a uniform pressure body of undegraded resin flowing through the transfer channel and onto the mandril. The equilibration chamber provides a constant circumferential supply of resin at the upstream end of the transfer channel.

Other objects and features of the invention will become apparent as the description proceeds, especially when taken in conjunction with the accompanying drawings illustrating the invention, of which there are seven sheets and one embodiment.

DETAILED DESCRIPTION OF THE DRAWINGS

Figure 2:
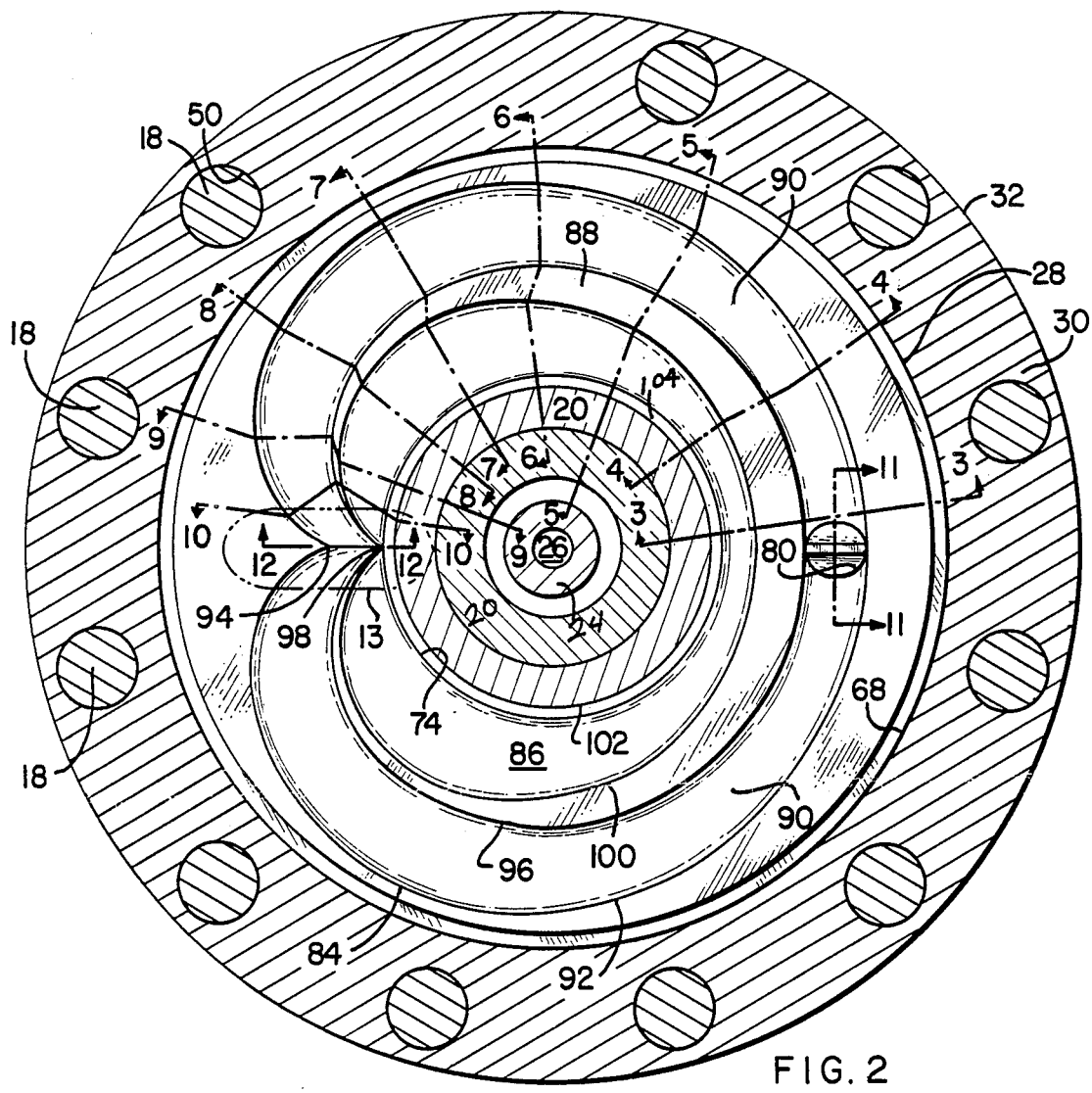
FIG. 2 is a sectional view taken along line 2—2 of FIG. 1.
Figure 3:
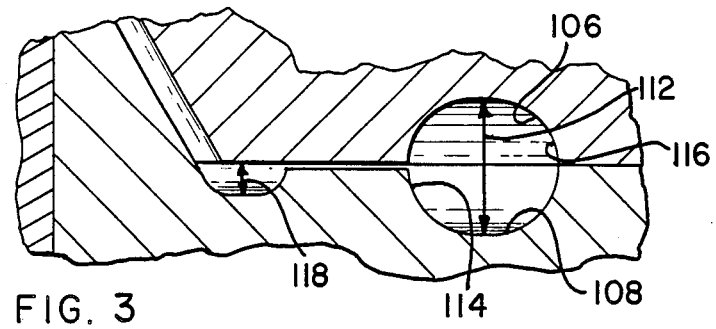
FIGS. 3 through 12 are sectional views taken respectively along lines 3—3 through 12—12 of FIG. 2.
Figure 4:
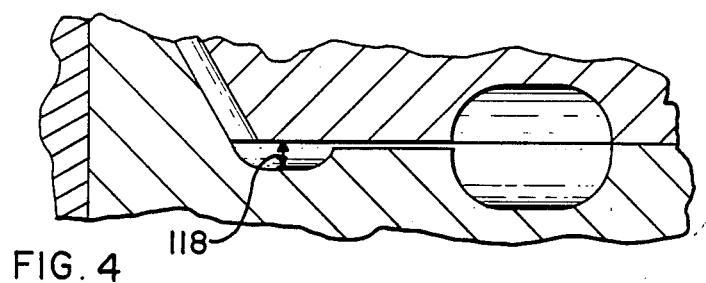
Figure 5:
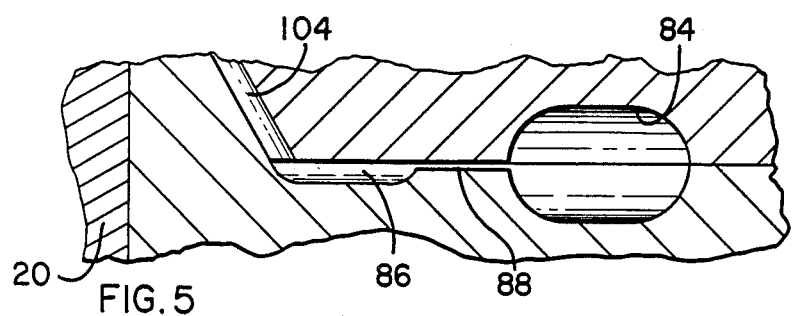
Figure 6:
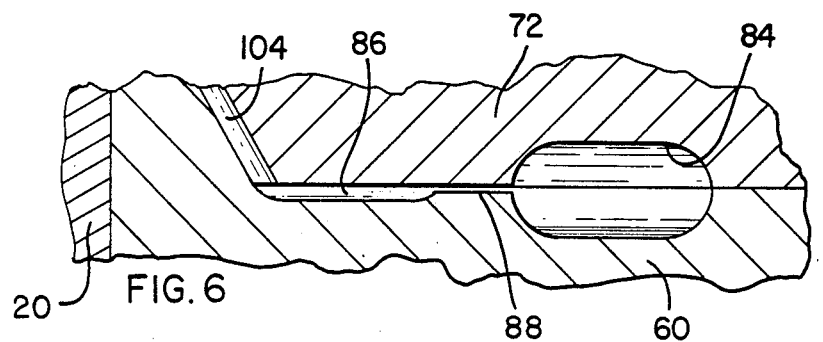
Figure 7:
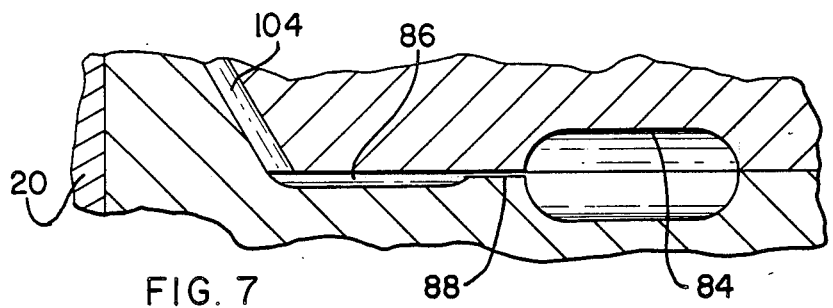
Figure 8:
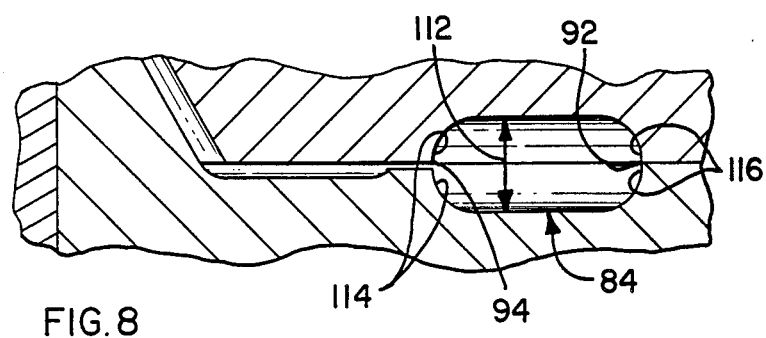
Figure 9:
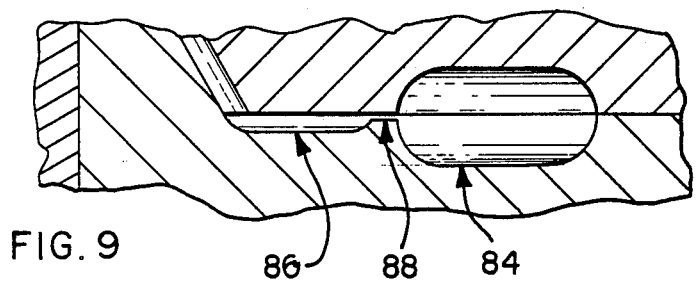
Figure 10:
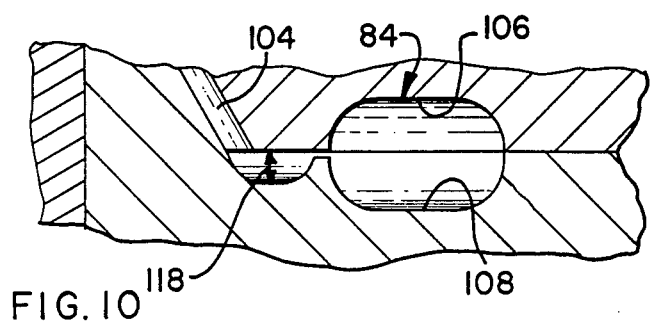
Figure 11:
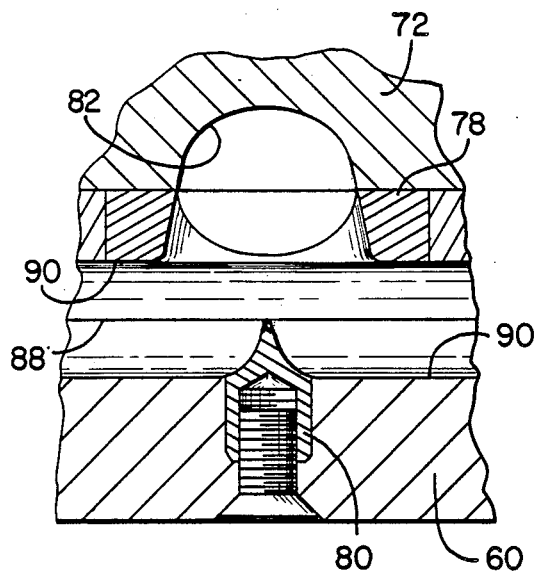
Figure 12:
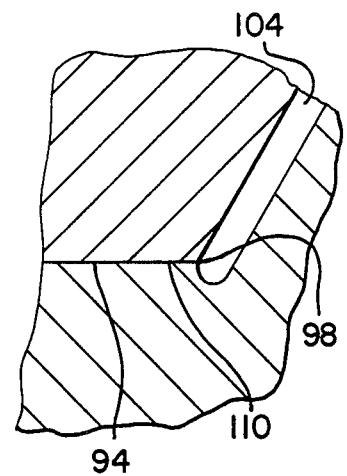

Parison extrusion head 10 includes a cross head die module 12 confined between clamp plates 14 and 16 by a plurality of bolts 18 illustrated in FIG. 2. A cylindrical mandril 20 is mounted in the upstream clamp plate 14 and extends in a downstream direction through a bore extending through the module 12, downstream clamp plate 16 and an extrusion die (not illustrated) mounted on plate 16.

The extrusion die is of conventional design and includes bushing surrounding a die pin to define an annular extrusion opening located on the downstream end of cylindrical resin extrusion channel 22. The die pin is mounted on the end of a stem 24 fitted within a central opening in mandrel 20. A blow passage 26 extends through the stem and die pin. During operation of head 10 the passage 26 is connected to a supply of gas which is flowed through the pin and into the interior of the extruded parison to prevent collapse of the parison.

Die module 12 defines a flow path for thermoplastic resin forming the parison extruded from the head. The module includes upstream and downstream module plates 28 and 30 having a generally cylindrical outer circumferential surface 32. The flow path in each module is located between the plates and extends from inlet port 34 to a 360 degree mouth 36 surrounding the mandril at channel 22. Inlet port 34 is connected to a screw-type extruder which flows heated, softened and plasticized thermoplastic resin to the module at an appropriate flow rate, temperature and pressure for flowing resin through the head and formation of a desired parison.

The downstream module plate 30 includes a flat surface 38 facing downstream and a small diameter cylindrical neck 40 concentric with the mandril axis 39 and projecting above surface 38. The upstream module plate 28 includes a flat surface 42 facing upstream and a small diameter cylindrical recess 44 surrounding and concentric with the mandril axis. The module plates are preferably formed from steel.

The upstream clamp plate 14 is provided with a narrow cylindrical neck 46 concentric with the mandril axis and having a close fit within recess 44 of module 12. Neck 40 is fitted within a circular recess 48 in the downstream clamp plate 16. Bolts 18 extend through bores 50 in the circumferential areas of modules 12 and through similar bores in the clamp plates 14 and 16 so that they clamp the plates 14, 16, 28 and 30 tightly together.

Cylindrical bore 52 extends through the center of plates 28, 30 and 16 and continues into the die head. The mandrel 20 includes a first cylindrical portion 54 having a close sliding fit within the bore 52 in plate 28. A inwardly tapered step 56 joins mandrel portion 54 to reduced diameter cylindrical portion 58 which extends through plate 29 to the extrusion die. The resin extrusion channel 22 is located between bore 52 and mandrel portion 58. The step 56 is located radially inwardly of mouth 36.

Upstream module plate 28 includes a thick disk 60 between surfaces 42 and 62 which extend perpendicular to the mandrel axis and a downstream projecting conical portion 64 having an interior surface forming part of bore 52. The mandrel portion 54 has a close sliding fit within the interior of the conical portion 64. The exterior surface 66 of the conical portion lies on the frustrum of the cone. Step 56 forms an extension of surface 66. See FIG. 1. The outer circumference of disk 60 is defined by cylindrical step 68 and exterior flange 70.

Downstream module plate 30 includes a thick disk 72 with neck 40 extending downstream from the disk and an interior surface of the disk including a cylindrical portion forming part of bore 52 at the neck and a surface 74 on the frustrum of a cone spaced a distance from the conical surface 66 of plate 28 and step 56. A cylindrical recess 76 is formed in the upper surface of disk 30 so that when the plates are mounted together disk 60 extends into or nests in the recess 76 within disk 30, the two plates are held coaxial to the mandrel axis 39 and flange 70 is flush on the outer surface of disk 30 as illustrated. The interfacer between plates 28 and 30 adjacent conical portion 64 lies in a plane perpendicular to axis 39.

Inserts 78 and 80 are confined in recesses in the plates 28 and 30 adjacent the inlet port 34 as shown. A plurality of tie bolts (not illustrated) may be used to hold the two plates 28 and 30 together as a module as illustrated in addition to the previously mentioned bolts 18.

The resin flow path for head 10 includes inlet passage 82 running from inlet 34 to a generally cardioid shaped primary distribution channel 84 extending around the mandrel axis and spaced radially outwardly of the conical portion 64 of plate 28. The channel 84 is formed in the interface between module plates 28 and 30. An equilibration or decompression chamber 86 surrounds the mandrel axis and is formed in surface 62 of plate 28 at the base of the conical portion 64. The primary distribution channel and the equilibration chamber ae communicated by a narrow depth circumferential gate passage 88 also extending around the mandrel axis. The gate passage is also formed in plate 28.

Insert 78 is confined within a recess in plate 72 and cooperates with knife edge divider insert 80 to assure that resin flowing through the inlet passage 82 is divided into two flows smoothly channeled into the like arms 90 of the primary distribution channel.

The radial outer and inner edges 92 and 96 of channel 84 lie in a plane perpendicular to the mandrel axis. Edge 92 has the shape of a mathematical cardioid with a cusp 94 located 180 degrees away from the center of the resin inlet passage 82 at the channel 84. See FIG. 2. Cusp 94 is spaced radially outwardly of surface 74. The inner edge 96 of chamber 84 lies in the same plane as edge 92 and has the shape of a second mathematical cardioid with a cusp 98 adjacent and radially inwardly of cusp 94. Cusp 98 is located at the edge of portion 74 180 degrees opposite from the inlet 80. The cusps are spaced apart a distance equal to the radial width of passage 82 at channel 84 as shown in FIG. 2. The inlet 80 is located at the minimum spacing between two edges 92 and 96 and is tangent to both edges.

The equilibration chamber 86 has an outer edge 100 lying on a mathematical cardioid having a cusp also located at point 98. The inner circular inner edge 102 of the equilibration chamber lies at the intersection of the interface plane with the conical portion 64. The equilibration chamber opens into conical transfer passage 104 extending along portion 64 to the 360 degree mouth 36 and resin channel 22.

Figure 14:
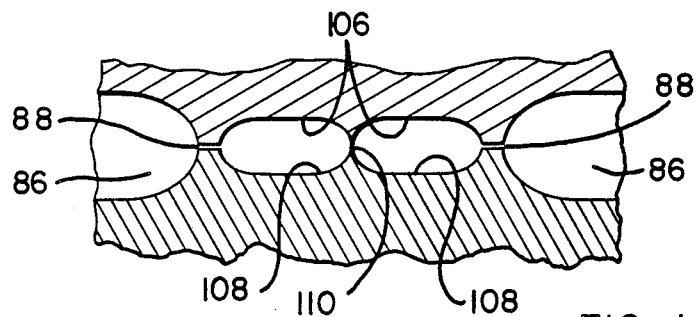
FIG. 14 is a sectional view taken along line 14—14 of FIG. 13.
Figure 13:
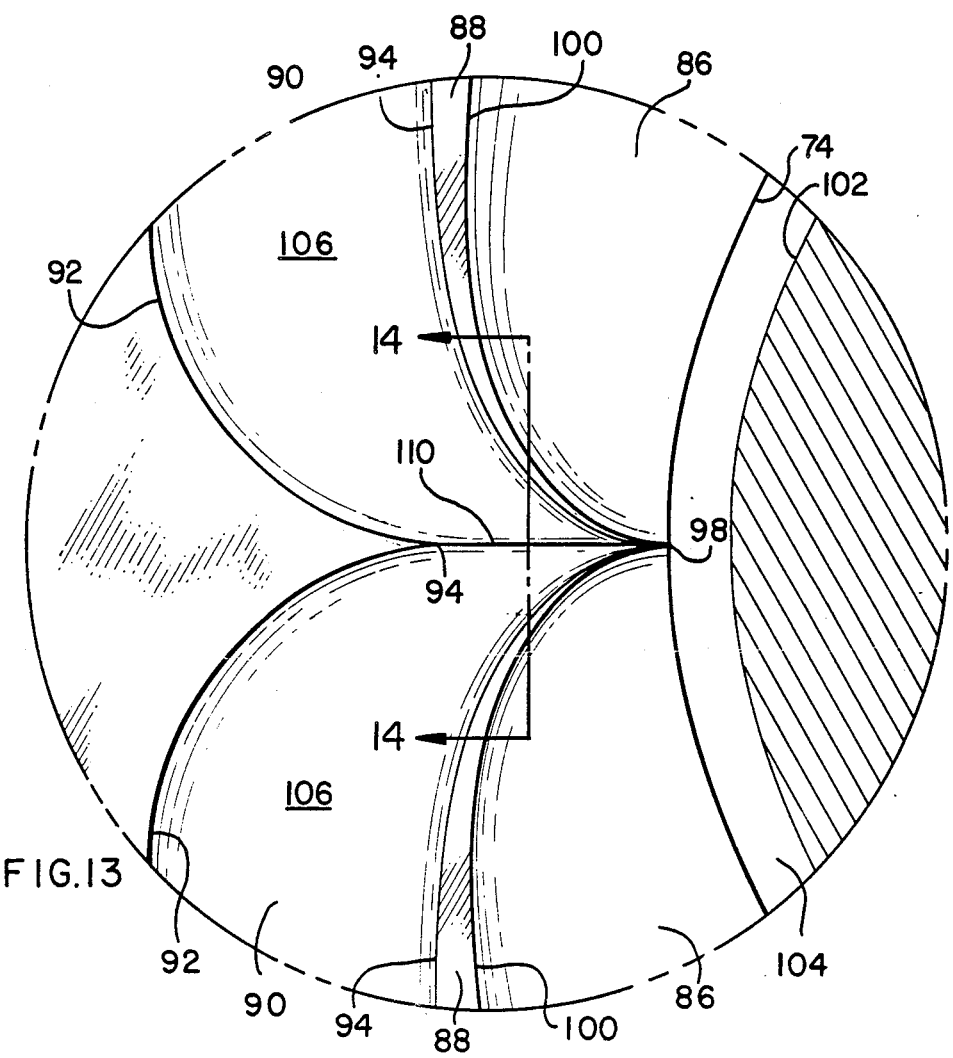
FIG. 13 is an enlarged view of portion 13 of FIG. 2.

The cross sectional flow area of each arm 90 of channel 84 is greatest at the inlet passage 82 and smoothly and continuously decreases around the arms to zero at the 180 degree or cusp position located opposite the inlet. Thermoplastic resin flows from the inlet around each arm and, at the same time, flows radially inwardly through the gate passage 88 into the equilibration chamber 86. The resin flows from the primary distribution channel into the gate passage uniformly for each angular increment around the mandril axis, thereby assuring a uniform inward radial flow into the equilibration chamber. The decrease in the cross sectional flow area of the primary distribution channel from the inlet to the 180 degree position assures that resin flows through the passage without stagnation while flowing radially inwardly through the gate passage 88 to the equilibration chamber 86. The cross sectional flow area of the primary distribution channel decreases to zero at the 180 degree cusp position, as shown in FIGS. 13 and 14, where the opposite channel walls 106 and 108 touch at a radial line 110 extending between cusps 94 and 98. The radial length of the gate passage 88 decreases to zero at cusp 98.

As shown in FIG. 2, the width of the primary distribution channel, as measured between the inner and outer edges 92 and 96, is at a minimum at the inlet, increases along each arm to a maximum approximately 120 degrees from the inlet and then decreases to a minimum at the 180 degree position. As shown in FIGS. 3 through 10 and 12, the depth 112 of the primary distribution channel 84 increases from a maximum adjacent the inlet to a minimum at the maximum width position approximately 120 degrees from the inlet, increases from the minimum depth and then decreases to zero at line 110 180 degrees from the inlet. The depth of the channel varies in this manner to assure the cross sectional flow area of the channel smoothly and uniformly decreases from the inlet to the opposite 180 degree position, despite the increase and decrease of the width of the channel. The chamber top and bottom walls 106 and 108 are flat with rounded inner and outer walls 114 and 116.

The gate passage 88 is formed between two parallel plates 28 and 30. The passage has a uniform known depth. The radial width of the passage, as measured by the distance between cardioid edges 96 and 100 smoothly decreases from a maximum at the inlet to zero at cusp 98. The pressure of the resin in primary distribution chamber 84 decreases from a maximum at the inlet to a minimum at the 180 degree position. The gate passage decreases the pressure of resin flowing through the gate passage proportionally to the width of the passage to provide a uniform pressure inward flow of resin past edge 100 and into the equilibration chamber.

Figure 1:
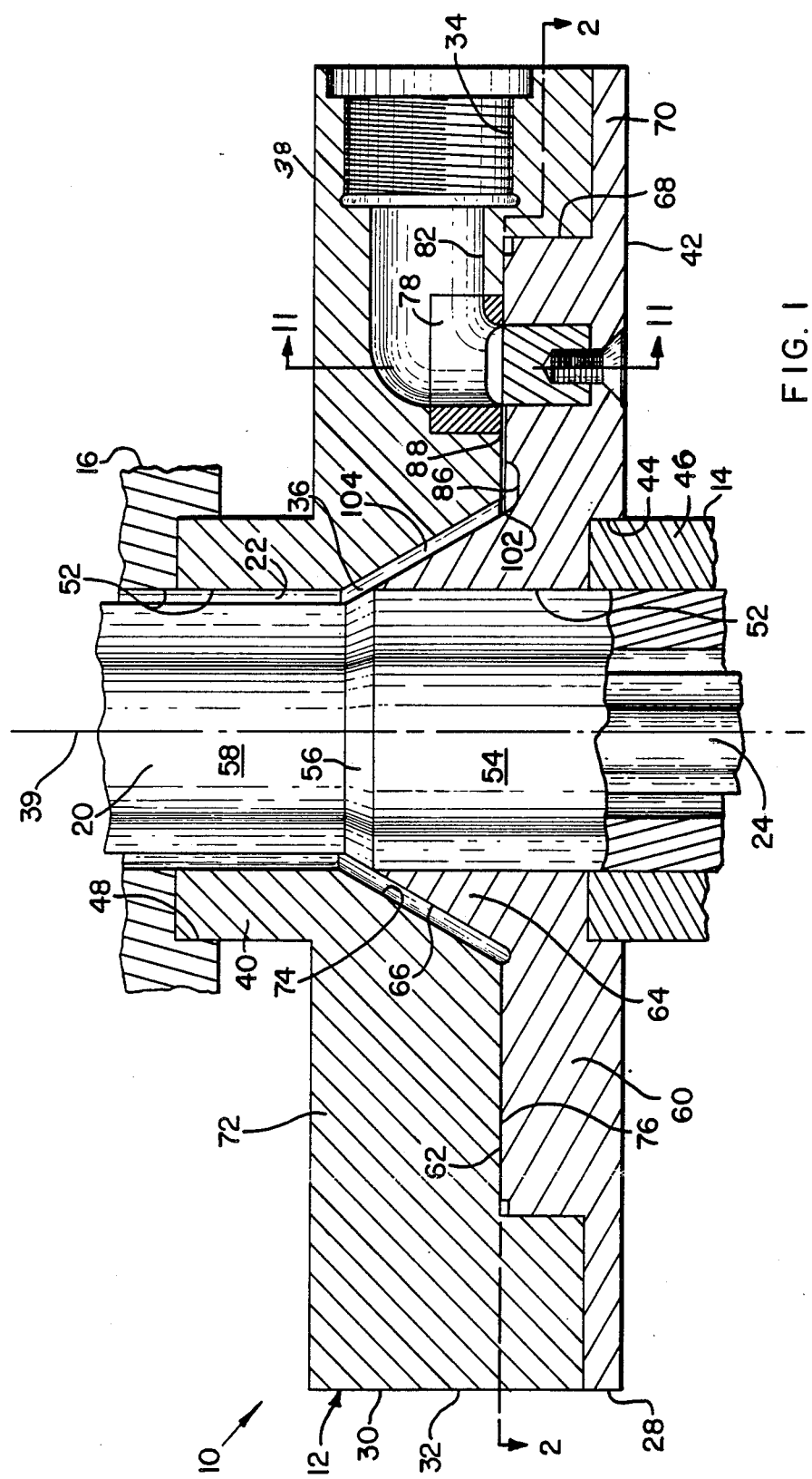
FIG. 1 is a sectional view taken through the longitudinal axis of a parison extrusion head having a single cross head die module according to the invention.

The equilibration chamber 86 has essentially a uniform cross sectional area in radial planes with the exception of the small portion of the chamber adjacent the 180 degree position shown in FIG. 1. The radial width of the chamber increases from a minimum opposite the inlet to a maximum at approximately 120 degrees to either side of the inlet and then decreases to a minimum at cusp 98. The depth 118 correspondingly decreases from a maximum adjacent the inlet 80 to a minimum at the maximum width position and then increases with decreasing width toward cusp 98.

The essentially uniform radial area of the equilibration chamber 86 provides an essentially uniform volume of resin surrounding the upper end of the transfer channel 104. The chamber has sufficient volume so that resin flowing into the chamber is equilibration and flows out of the chamber, into the transfer channel thereby assuring a uniform circumferential flow of equal pressure resin onto the mandril.

The parison extrusion head is connected to an extruder which flows heated, softened and plasticized thermoplastic resin at a desired temperature and pressure into the inlet port 34 of cross head die module 12. The resin flowing through inlet passage 82 is divided by knife edge insert 80 into two equal flows filling arms 90 of channel 84. The resin flows radially inwardly through the circumferential gate passage 88 and into the equilibration chamber 86. Resin flows across the length of edge 100 and into the equilibration chamber at a uniform rate to provide a uniform radial inward flow into the chamber. Pressure gradients of resin flowed into the chamber are equilibrated during residence of the resin within the chamber. Uniform pressure resin flows from the equilibration chamber into the upstream large diameter end of the transfer channel 104, along the channel to mouth 36 and then along the resin extrusion channel 22.

The resin flows through the arms of the primary distribution channel without stagnation. This flow reduces the risk that the resin properties are degraded by prolonged exposure of stagnant resin to the high module operating temperature. Elimination of stagnation also facilitates purging of the resin flow paths during a change over from a first resin to a second resin.

A number of cross head die modules like module 12 may be stacked in a single extrusion head surrounding a mandrel so that each module flows a individual layer of plastic onto the mandrel to form a multi-layer co-extruded parison. Conventional heaters may be provided to maintain the modules at optimum flow temperatures for the individual resins flowed through the modules. Adjacent modules may be temperature isolated to prevent the heat flowing from a high temperature module to an adjacent low temperature module sufficient to raise the temperature of the resin flowing to the low temperature module above the optimum flow temperature.

While I have illustrated and described a preferred embodiment of my invention, it is understood that this is capable of modification, and I therefore do not wish to be limited to the precise details set forth, but desire to avail myself of such changes and alternations as fall within the purview of the following claims.

What I claim as my invention is:

1. A cross head die module for extrusion of an annular flow of thermoplastic resin onto a mandril, the module having:
   A. a body with a resin inlet passage on one side of the body, an annular resin mouth within the body and a resin flow path communicating the inlet passage and mouth, the path comprising:
      i. a primary distribution channel in resin flow communication with the inlet passage and having inner and outer edges and two like arms each extending from the inlet passage approximately halfway around the channel, the cross sectional area of each arm decreasing from a maximum at the inlet passage to a minimum at the end of the arm, the inner primary distribution channel edge lying on a cardioid-shaped curve with the curve having a cusp located opposite from and pointing toward the inlet passage,
      ii. a narrow height gate passage having an outer edge at the inner edge of the primary distribution channel, an inner edge and a decreasing radial width away from the inlet, and
      iii. a first passage communicating the inner edge of the gate passage with the mouth,
   B. whereby heated, softened and pressurized resin supplied to the inlet passage moves through the primary distribution channel, the gate and first passage and out the mouth onto a mandril in a circumferentially uniform annular flow.

2. A cross head die module as in claim 1 wherein the depth of each arm of the primary distribution channel has a minimum and a maximum between the inlet passage and the end of the arm.

3. A cross head die module as in claim 1 wherein the width of each arm of the primary distribution channel has a maximum between the inlet passage and the end of the arm.

4. A cross head die module as in claim 1 wherein the cross sectional area of each arm of the primary distribution channel decreases smoothly and continuously from the inlet passage to zero at the end of the arm.

5. A cross head die module as in claim 4 wherein the outer edge of the primary distribution channel lies on the continuous cardioid-shaped curve having a cusp located opposite the inlet passage.

6. A cross head die module as in claim 5 wherein the cusp of the outer edge of the primary distribution channel is located radially outwardly of the cusp of the inner edge of the primary distribution channel.

7. A cross head die module as in claim 5 wherein the depth of the primary distribution channel along each arm from the inlet passage to the end of the arm first decreases to a minimum at a maximum width between the inner and outer edges, increases to a maximum and then decreases to zero at the cusps.

8. A cross head die module as in claim 4 wherein the gate passage is annular.

9. A cross head die module as in claim 8 wherein the radial width of the gate passage decreases to zero at the cusp.

10. A cross head die module as in claim 8 wherein the inner edge of the gate passage lies on a cardioid-shaped curve having a cusp opposite the inlet passage.

11. A cross head die module as in claim 10 wherein the cusps of the inner edges of the primary distribution channel and of the gate passage are located at the same point.

12. A cross head die module as in claim 8 wherein the first passage includes an annular equilibration chamber at the inner edge of the gate passage.

13. A cross head die module as in claim 12 wherein the radial width of the equilibration chamber is reduced to a minimum at the cusp.

14. A cross head die module as in claim 13 wherein the equilibration chamber has an essentially uniform cross sectional area away from the cusp.

15. A cross head die module as in claim 14 wherein the radial width of each half of the equilibration chamber increases from a minimum adjacent the inlet passage to a maximum and then decreases to a minimum adjacent the cusp.

16. A cross head die module as in claim 15 wherein the first passage includes a conically shaped transfer channel communicating the equilibration chamber and mouth.

17. A cross head die module for extrusion of an annular flow of thermoplastic resin onto a mandril, the module having:
A. a body formed from a pair of plates fitted together at an interface with a resin inlet passage on one side of the body, an annular resin mouth within the body at the interface and a resin flow path in the interface communicating the inlet passage and mouth, the path comprising:
i. an annular primary distribution channel in resin flow communication with the inlet passage and having an inner edge surrounding the mouth and lying on a cardioid-shaped curve having a cusp located opposite from and pointing toward the inlet passage and two like arms each extending from the inlet passage to the cusp, the cross sectional area of each arm smoothly and gradually decreasing from a maximum at the inlet passage to zero at the cusp,
ii. an annular narrow height gate passage having an outer edge at the inner edge of the primary distribution channel, an annular inner edge and a decreasing width away from the inlet and a continuous inner edge,
iii. an equilibration chamber communicating with the inner edge of the gate passage, and
iv. an annular transfer channel communicating the equilibration chamber with the mouth,
B. whereby heated, softened and pressurized resin supplied to the inlet passage moves through the distribution channel without stagnation, flows through the gate and into the equilibration chamber at approximately uniform pressure and remaining pressure gradients in the resin are equilibrated in the equilibration chamber and then flows through the transfer channel and out the mouth onto a mandril in a circumferentially uniform and undegraded annular flow.

18. A cross head die module as in claim 17 wherein the inner edge of the gate passage lies on a cardioid-shaped curve with a cusp located opposite from the inlet passage.

19. A cross head die module as in claim 18 wherein the cusps are located at the same point.

20. A cross head die module as in claim 18 wherein the equilibration chamber has an essentially constant cross sectional area away from the cusp.

21. A cross head die module as in claim 17 wherein the primary distribution channel includes an outer edge lying on a second cardioid-shaped curve and having a cusp adjacent the cusp on the inner edge.

22. A cross head die module as in claim 21 wherein said cusps are radially spaced apart.

23. A cross head die as in claim 22 wherein said transfer channel is conical in shape.

* * * * *